US010086684B1

(12) United States Patent
Stamm, Jr.

(10) Patent No.: US 10,086,684 B1
(45) Date of Patent: Oct. 2, 2018

(54) MODIFIED PICKUP TRUCK CAP AND STORAGE SYSTEM FOR USE WITH A PICKUP TRUCK AND METHODS OF MAKING AND USING SAME

(71) Applicant: Vernon Frank Stamm, Jr., Saylorsburg, PA (US)

(72) Inventor: Vernon Frank Stamm, Jr., Saylorsburg, PA (US)

( * ) Notice: Subject to any disclaimer, the term of this patent is extended or adjusted under 35 U.S.C. 154(b) by 0 days.

(21) Appl. No.: 15/933,577

(22) Filed: Mar. 23, 2018

(51) Int. Cl.
| | |
|---|---|
| B60J 7/16 | (2006.01) |
| B60R 5/04 | (2006.01) |
| B60P 7/02 | (2006.01) |
| B60P 3/34 | (2006.01) |
| B62D 33/027 | (2006.01) |

(52) U.S. Cl.
CPC .............. *B60J 7/1621* (2013.01); *B60P 3/34* (2013.01); *B60P 7/02* (2013.01); *B60R 5/042* (2013.01); *B62D 33/0273* (2013.01)

(58) Field of Classification Search
CPC ....... B60P 3/32; B60P 3/34; B60P 7/02; B60J 7/1621; B60J 5/049; B60J 5/104; B60R 5/042; B62D 33/0273
USPC ................ 296/165, 164, 26.04, 26.06, 26.07
See application file for complete search history.

(56) References Cited

U.S. PATENT DOCUMENTS

| | | | |
|---|---|---|---|
| 3,690,719 A | 9/1972 | Yount | |
| 3,953,066 A * | 4/1976 | Hamilton | B60P 3/34 135/88.13 |
| 3,954,296 A * | 5/1976 | Patnode | B60J 7/1621 296/10 |
| 4,335,916 A * | 6/1982 | Gutgsell | B60P 3/42 296/100.1 |
| 4,890,879 A * | 1/1990 | Hurlock | B62D 35/002 296/156 |
| 5,127,701 A * | 7/1992 | Miller | B60J 7/1621 296/100.06 |
| 5,421,633 A * | 6/1995 | Moore | B60P 3/34 16/231 |
| 5,735,565 A * | 4/1998 | Papai | B60P 3/34 296/165 |
| 6,364,329 B1 * | 4/2002 | Holub | A45C 5/14 280/47.26 |
| 7,093,882 B2 | 8/2006 | Lake | |
| 7,118,163 B1 * | 10/2006 | Overcash | B60J 5/101 296/146.8 |
| 7,690,713 B2 | 4/2010 | Lake | |

(Continued)

*Primary Examiner* — Gregory A Blankenship
(74) *Attorney, Agent, or Firm* — James R. McDaniel

(57) ABSTRACT

A pickup truck cap and storage system, including a pickup truck having a truck bed and a plurality of truck bed sidewalls operatively connected to the truck bed, a frame assembly operatively connected to one end of the truck bed and a portion of each of the plurality of truck bed sidewalls, a pickup truck cap assembly operatively connected to the plurality of truck bed sidewalls and the frame assembly, a door assembly operatively connected to the frame assembly and located adjacent to one end of the pickup truck cap assembly, wherein the truck bed, the plurality of truck bed sidewalls, the pickup truck cap assembly, and the door assembly, when operatively connected, form an interior space in the pickup truck cap and storage system, and a storage system assembly located within the interior of the pickup truck cap and storage system.

17 Claims, 11 Drawing Sheets

(56) References Cited

U.S. PATENT DOCUMENTS

| | | | | |
|---|---|---|---|---|
| 8,182,020 B2* | 5/2012 | Herndon | ............... | B62D 35/007 |
| | | | | 296/100.06 |
| 8,408,626 B1 | 4/2013 | Herndon | | |
| 8,757,699 B2 | 6/2014 | Kalack | | |
| 2001/0048232 A1* | 12/2001 | Thompson | ............... | B60P 3/341 |
| | | | | 296/165 |
| 2002/0008406 A1* | 1/2002 | Phillips | ................. | B60P 3/341 |
| | | | | 296/164 |
| 2003/0146646 A1* | 8/2003 | Cervenka | ................ | B60P 3/341 |
| | | | | 296/165 |
| 2008/0164721 A1* | 7/2008 | Semotuk | ................. | B60P 3/34 |
| | | | | 296/165 |
| 2009/0256381 A1* | 10/2009 | Bankert | ................ | B60J 7/1621 |
| | | | | 296/100.1 |
| 2011/0309651 A1 | 12/2011 | Hernandez et al. | | |
| 2014/0367991 A1* | 12/2014 | Loranger | ................ | B60P 3/341 |
| | | | | 296/165 |
| 2016/0114661 A1* | 4/2016 | Yamaguchi | ................ | B60J 1/18 |
| | | | | 296/146.2 |

\* cited by examiner

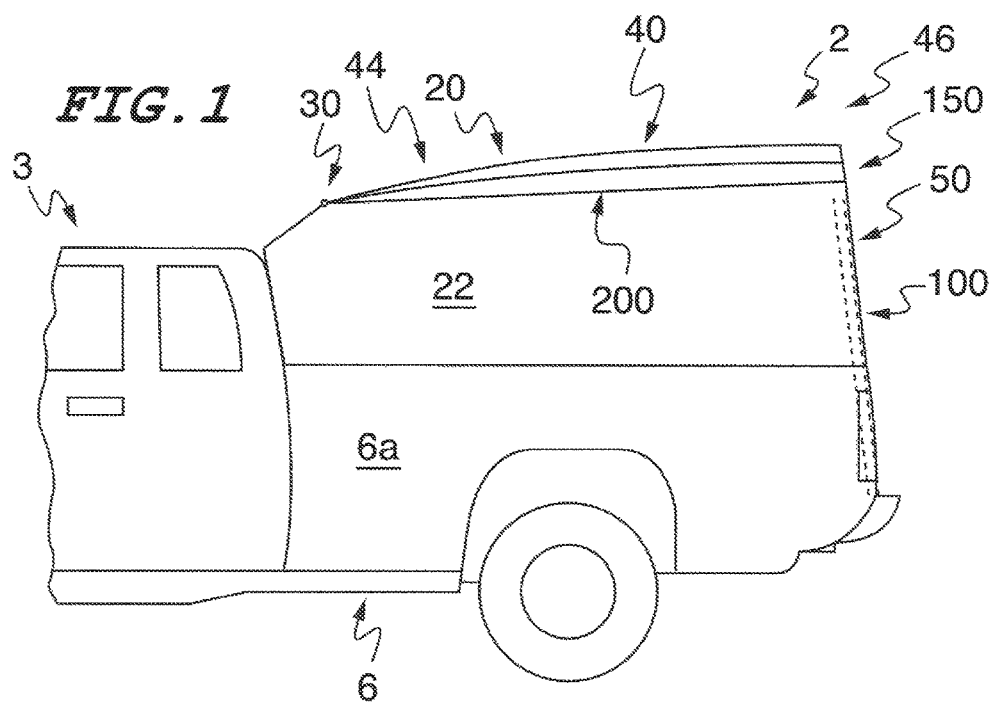
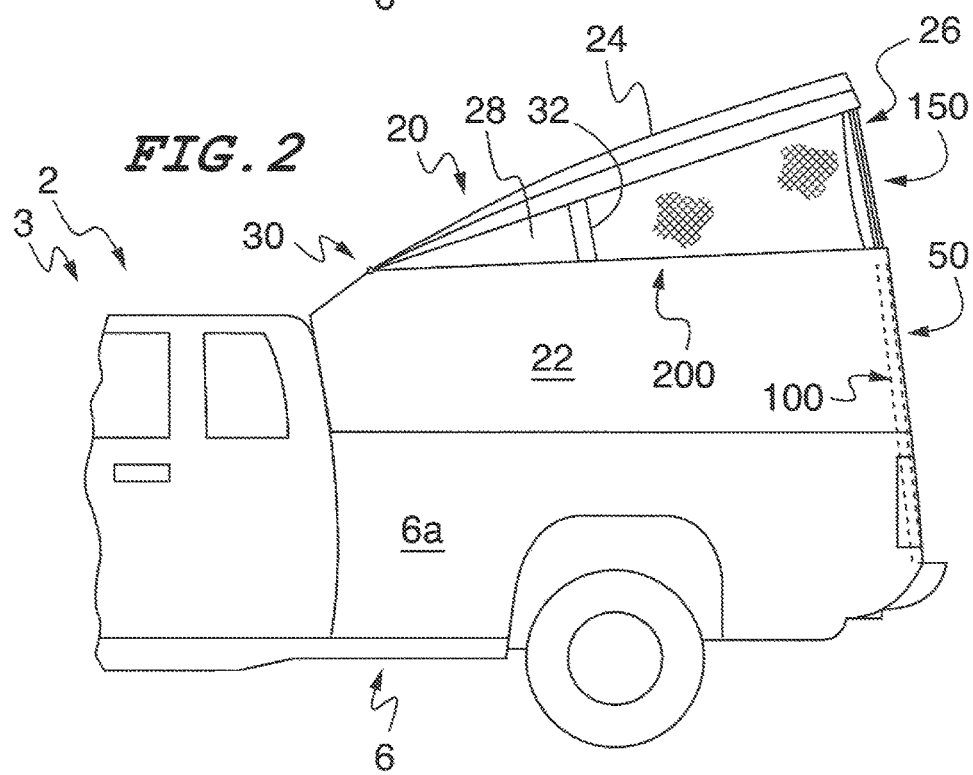

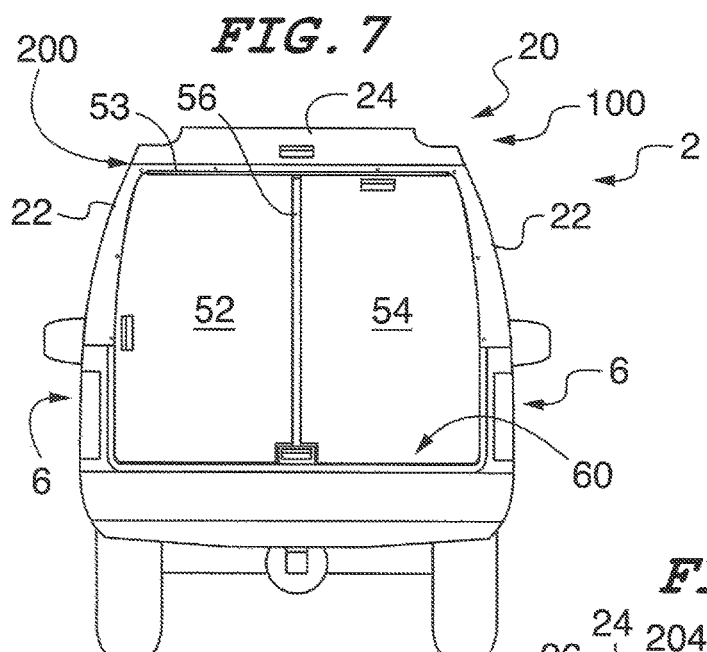
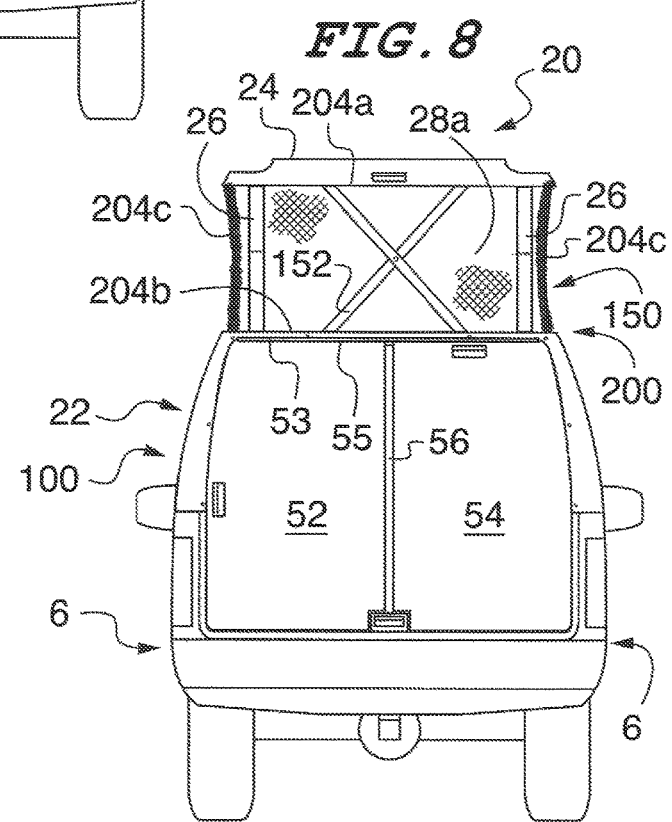

MODIFIED PICKUP TRUCK CAP AND STORAGE SYSTEM FOR USE WITH A PICKUP TRUCK AND METHODS OF MAKING AND USING SAME

FIELD OF THE INVENTION

The present invention is generally related to a pickup truck cap and storage system that can be used on a pickup truck. The pickup truck cap has been modified so that the roof of the pickup truck cap can be raised/lifted up at one end to allow more headroom for the user while the user is utilizing the interior of the pickup truck cap and storage system. Also, the pickup truck cap and storage system includes a storage area located within the interior of the pickup truck cap and storage system that will allow the user to store various items within the storage area. In this manner, the pickup truck cap and storage system can be used as a living, working and/or storage space.

BACKGROUND OF THE INVENTION

Prior to the present invention, as set forth in general terms above and more specifically below, it is known, to employ various types of pickup cap systems. See for example, U.S. Pat. No. 3,690,719 by Yount, U.S. Pat. No. 7,093,882 by Lake, U.S. Pat. No. 7,690,713 by Lake, U.S. Pat. No. 8,182,020 by Herndon, U.S. Pat. No. 8,408,626 by Herndon, U.S. Pat. No. 8,757,699 by Kalack and U.S. Patent Application Publication 2011/0309651 by Hernandez et al. While these various pickup cap systems may have been generally satisfactory, there is nevertheless a need for a new and improved pickup truck cap and storage system that can be used on a pickup truck, wherein the roof of the pickup truck cap can be raised/lifted up at one end to allow more headroom for the user while the user is utilizing the interior of the pickup truck cap and storage system. Also, the new and improved pickup truck cap and storage system includes a storage area located within the interior of the pickup truck cap and storage system that will permit the user to store various items within the storage area thereby allowing the pickup truck cap and storage system to be used as a living, working and/or storage space.

It is a purpose of this invention to fulfill these and other needs in the pickup truck cap art in a manner more apparent to the skilled artisan once given the following disclosure.

BRIEF SUMMARY OF THE INVENTION

A first aspect of the present invention is a pickup truck cap and storage system, including: a pickup truck having a truck bed and a plurality of truck bed sidewalls operatively connected to the truck bed; a pickup truck cap and storage system frame assembly operatively connected to one end of the truck bed and a portion of each of the plurality of truck bed sidewalls; a pickup truck cap assembly operatively connected to the plurality of truck bed sidewalls and the pickup truck cap and storage system frame assembly; a pickup truck cap and storage system door assembly operatively connected to the pickup truck cap and storage system frame assembly and located adjacent to one end of the pickup truck cap assembly, wherein the truck bed, the plurality of truck bed sidewalls, the pickup truck cap assembly, and the pickup truck cap and storage system door assembly, when operatively connected, form an interior space in the pickup truck cap and storage system; and a pickup truck cap and storage system assembly located within the interior of the pickup truck cap and storage system.

In one embodiment of the first aspect of the present invention, the pickup truck cap assembly further includes: a plurality of truck cap sidewalls; a roof having a first end and a second end, wherein the roof is located adjacent to the plurality of truck cap sidewalls; a hinge operatively connected to the first end of the roof and one of the plurality of truck cap sidewalls; and a pickup truck cap lift assembly operatively connected to the second end of the roof and the pickup truck cap and storage system frame assembly for raising and lowering the roof.

In another embodiment of the first aspect of the present invention, the pickup truck cap lift assembly further includes: a first plurality of piston assists operatively connected to the second end of the roof and the pickup truck cap and storage system frame assembly; and a scissors mechanism located adjacent to the first plurality of piston assists and operatively connected to the second end of the roof and the pickup truck cap and storage system frame assembly.

In another embodiment of the first aspect of the present invention, the pickup truck cap assembly further includes: a roof/sidewall/screen molding assembly operatively connected to a top of the plurality of truck bed sidewalls and along a bottom of the plurality of truck cap sidewalls.

In another embodiment of the first aspect of the present invention, the pickup truck cap assembly further includes: a first screen operatively connected to the roof/sidewall/screen molding assembly and a bottom of the roof; and a second screen operatively connected to the first screen, the bottom of the roof and a portion of the plurality of truck cap sidewalls.

In still another embodiment of the first aspect of the present invention, the pickup truck cap and storage system door assembly further includes: a first door hinge operatively connected to the truck bed and the pickup truck cap and storage system frame assembly; a first door operatively connected to the first door hinge; a second door hinge operatively connected to the truck bed; a second door operatively connected to the second door hinge; and a third door hinge located adjacent to the second end of the roof and operatively connected to the pickup truck cap and storage system frame assembly, wherein the first and second doors, when secured together, can be operatively connected to the third door hinge.

In an even further embodiment of the first aspect of the present invention, the pickup truck cap and storage system assembly further includes: a shelf support operatively connected to the truck bed and the pickup truck cap and storage system frame assembly; a shelf located on top of the shelf support; a plurality of containers located under the shelf; and a roller operatively connected to at least one of the plurality of containers for assisting in the insertion into and the removal from the interior of the pickup truck cap and storage system.

In yet another embodiment of the first aspect of the present invention, the pickup truck cap assembly further includes: an aerodynamic raised area located along a portion of the top of the roof.

In still another embodiment of the first aspect of the present invention, the roof/sidewall/screen molding assembly further includes an H-shaped molding having an upper molding attachment and a lower molding attachment, wherein the first screen is operatively connected to the upper molding attachment and the lower molding attachment is operatively connected to a portion of the plurality of truck cap sidewalls.

A second aspect of the present invention is a recreational vehicle including: a pickup truck having a truck bed and a plurality of truck bed sidewalls operatively connected to the truck bed; a pickup truck cap and storage system frame assembly operatively connected to one end of the truck bed and a portion of each of the plurality of truck bed sidewalls; a pickup truck cap assembly operatively connected to the plurality of truck bed sidewalls and the pickup truck cap and storage system frame assembly; a pickup truck cap and storage system door assembly operatively connected to the pickup truck cap and storage system frame assembly and located adjacent to one end of the pickup truck cap assembly, wherein the truck bed, the plurality of truck bed sidewalls, the pickup truck cap assembly, and the pickup truck cap and storage system door assembly, when operatively connected, form an interior space in the pickup truck cap and storage system; and a pickup truck cap and storage system assembly located within the interior of the pickup truck cap and storage system.

In one embodiment of the second aspect of the present invention, the pickup truck cap assembly further includes: a plurality of truck cap sidewalls; a roof having a first end and a second end, wherein the roof is located adjacent to the plurality of truck cap sidewalls; a hinge operatively connected to the first end of the roof and one of the plurality of truck cap sidewalls; and a pickup truck cap lift assembly operatively connected to the second end of the roof and the pickup truck cap and storage system frame assembly for raising and lowering the roof.

In another embodiment of the second aspect of the present invention, the pickup truck cap lift assembly further includes: a first plurality of piston assists operatively connected to the second end of the roof and the pickup truck cap and storage system frame assembly; and a scissors mechanism located adjacent to the first plurality of piston assists and operatively connected to the second end of the roof and the pickup truck cap and storage system frame assembly.

In another embodiment of the second aspect of the present invention, the pickup truck cap assembly further includes: a roof/sidewall/screen molding assembly operatively connected to a top of the plurality of truck bed sidewalls and along a bottom of the plurality of truck cap sidewalls.

In another embodiment of the second aspect of the present invention, the pickup truck cap assembly further includes: a first screen operatively connected to the roof/sidewall/screen molding assembly and a bottom of the roof; and a second screen operatively connected to the first screen, the bottom of the roof and a portion of the plurality of truck cap sidewalls.

In still another embodiment of the second aspect of the present invention, the pickup truck cap and storage system door assembly further includes: a first door hinge operatively connected to the truck bed and the pickup truck cap and storage system frame assembly; a first door operatively connected to the first door hinge; a second door hinge operatively connected to the truck bed; a second door operatively connected to the second door hinge; and a third door hinge located adjacent to the second end of the roof and operatively connected to the pickup truck cap and storage system frame assembly, wherein the first and second doors, when secured together, can be operatively connected to the third door hinge.

In an even further embodiment of the second aspect of the present invention, the pickup truck cap and storage system assembly further includes: a shelf support operatively connected to the truck bed and the pickup truck cap and storage system frame assembly; a shelf located on top of the shelf support; a plurality of containers located under the shelf; and a roller operatively connected to at least one of the plurality of containers for assisting in the insertion into and the removal from the interior of the pickup truck cap and storage system.

In yet another embodiment of the second aspect of the present invention, the pickup truck cap assembly further includes: an aerodynamic raised area located along a portion of the top of the roof.

In still another embodiment of the second aspect of the present invention, the roof/sidewall/screen molding assembly further includes an H-shaped molding having an upper molding attachment and a lower molding attachment, wherein the first screen is operatively connected to the upper molding attachment and the lower molding attachment is operatively connected to a portion of the plurality of truck cap sidewalls.

A third aspect of the present invention is a method of modifying a pickup truck with a pickup truck cap and storage system, including the steps of: providing a pickup truck having a truck bed and a plurality of truck bed sidewalls operatively connected to the truck bed; providing a pickup truck cap and storage system frame assembly operatively connected to one end of the truck bed and a portion of each of the plurality of truck bed sidewalls; providing a pickup truck cap assembly operatively connected to the plurality of truck bed sidewalls and the pickup truck cap and storage system frame assembly; providing a pickup truck cap and storage system door assembly operatively connected to the pickup truck cap and storage system frame assembly and located adjacent to one end of the pickup truck cap assembly, wherein the truck bed, the plurality of truck bed sidewalls, the pickup truck cap assembly, and the pickup truck cap and storage system door assembly, when operatively connected, form an interior space in the pickup truck cap and storage system; and providing a pickup truck cap and storage system assembly located within the interior of the pickup truck cap and storage system.

In one embodiment of the third aspect of the present invention, the step of providing the pickup truck cap assembly further includes the steps of: providing a plurality of truck cap sidewalls; providing a roof having a first end and a second end, wherein the roof is located adjacent to the plurality of truck cap sidewalls; providing a hinge operatively connected to the first end of the roof and one of the plurality of truck cap sidewalls; and providing a pickup truck cap lift assembly operatively connected to the second end of the roof and the pickup truck cap and storage system frame assembly for raising and lowering the roof.

The preferred pickup truck cap and storage system, according to various embodiments of the present invention, offers the following advantages: ease of use; lightness in weight; durability; excellent pickup cap characteristics; ease of raising of the roof; ease of lowering of the roof; increased headroom in the cap area; improved aerodynamics; excellent storage characteristics; and ease of locking the pickup truck cap and storage system. In fact, in many of the preferred embodiments, these advantages are optimized to an extent that is considerably higher than heretofore achieved in prior, known pickup truck caps.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 1 is a schematic side view of the pickup truck cap and storage system being attached to a pickup truck bed with the pickup truck cap in the closed position and illustrating the location of the front hinge, constructed according to the present invention;

FIG. 2 is a schematic side view of the pickup truck cap and storage system being attached to a pickup truck bed with the pickup truck cap in the raised/open position and illustrating the location of the front hinge, constructed according to the present invention;

FIG. 7 is a schematic rear view of the pickup truck cap and storage system being attached to a pickup truck bed with the pickup truck cap in the closed position and illustrating the location of the rear doors, constructed according to the present invention;

FIG. 8 is a schematic rear view of the pickup truck cap and storage system being attached to a pickup truck bed with the pickup truck cap in the raised/open position and illustrating the location of the rear doors, constructed according to the present invention;

DETAILED DESCRIPTION OF THE PREFERRED EMBODIMENTS OF THE INVENTION

In order to address the shortcomings of the prior, known pickup cap systems, reference is made now to FIGS. 1 and 2, where there is illustrated pickup truck cap and storage system 2. As will be explained hereinafter in greater detail, the pickup truck cap and storage system 2 can be used on a conventional pickup truck 3, wherein the roof of the pickup truck cap 20 can be raised/lifted up at one end to allow more headroom for the user while the user is utilizing the interior of the pickup truck cap and storage system 2. Also, the new and improved pickup truck cap and storage system 2 includes a storage area 250 (FIG. 4) located within the pickup truck cap and storage system 2 that will permit the user to store various items within the storage area 250 thereby allowing the pickup truck cap and storage system 2 to be used as a living, working and/or storage space.

Figure 11A:
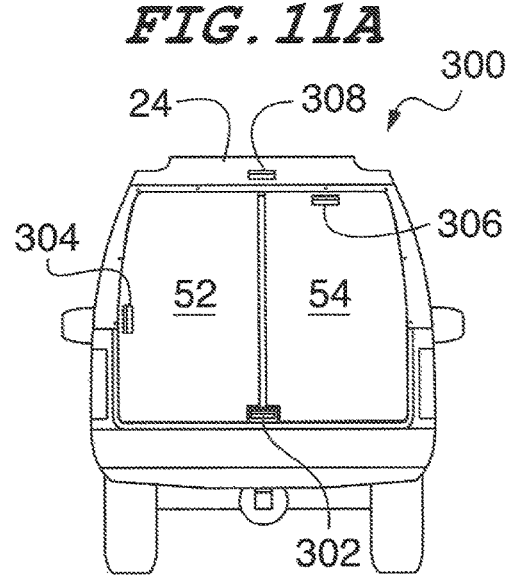
FIG. 11A is a schematic rear view of the pickup truck cap and storage system being attached to a pickup truck bed with the pickup truck cap in the closed position and illustrating the location of the various locking mechanisms, constructed according to the present invention.

As shown in FIGS. 1 and 2, there is illustrated pickup truck cap and storage system 2 that is constructed according to the present invention. Pickup truck cap and storage system 2 includes, in part, conventional pickup truck 3, pickup truck cap 20, roof hinge 30, pickup truck cap and storage system door assembly 50, pickup truck cap and storage system frame assembly 100, pickup truck cap lift assembly 150, roof/sidewall/screen molding assembly 200, pickup truck cap and storage system assembly 250 (FIG. 4), and pickup truck cap and storage system lock assembly 300 (FIG. 11A).

With respect to pickup truck 3, pickup truck 3 includes a conventional pickup truck bed 6 having truck bed sidewalls 6a such that pickup truck cap and storage system door assembly 50 and pickup truck cap and storage system frame assembly 100 can be properly supported by the pickup truck bed 6 and the truck bed sidewalls 6a, as will be described in greater detail later.

Figure 11B:
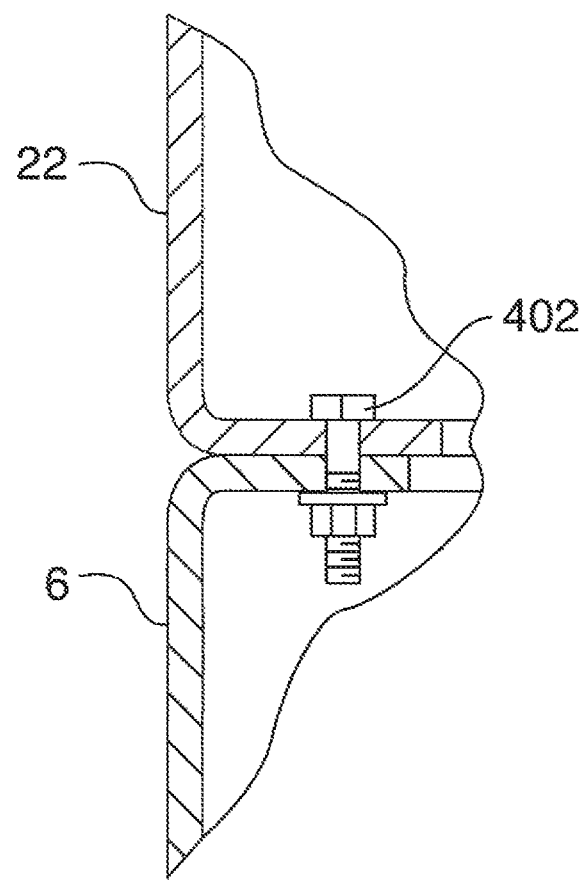
FIG. 11B is a close-up view, taken from FIG. 3, of the attachment of the pickup truck cap and storage system to the pickup truck bed wall, constructed according to the present invention.

Regarding pickup truck cap 20, pickup truck cap 20 includes, in part, pickup truck cap sidewalls 22, raisable/liftable roof 24, piston assists 26, screen 28, roof hinge 30 and conventional spring inserts 32. Preferably, pickup truck cap sidewalls 22 and raisable/liftable roof 24 are constructed of durable, lightweight, high strength materials such as aluminum or plastic. As will be described in greater detail later, pickup truck cap sidewalls 22 are conventionally attached to the top of truck bed sidewalls 6a by conventional fasteners 402 (FIG. 11B).

With respect to raisable/liftable roof 24, raisable/liftable roof 24 is conventionally attached at one end to roof hinge 30. As will be described in greater detail later, the other end of raisable/liftable roof 24 can be raised/lifted up to provide more headroom to the end user when the end user is located within the interior of pickup truck cap and storage system 2.

As will be described in greater detail later, there are at least two (2) piston assists 26 that are conventionally attached at one end to pickup truck cap and storage system frame assembly 100 and conventionally attached at the other end to raisable/liftable roof 24. Preferably, piston assists 26 are any suitable hydraulic, pneumatic, electric or mechanical actuators that provide a lifting motion that assists the end user in raising/lifting the raisable/liftable roof 24.

Attached between the raisable/liftable roof 24 and the pickup truck cap sidewalls 22 is screen 28. Preferably, screen 28 is any suitable, durable, UV-resistant, material that is capable of allowing air to flow through while substantially preventing insects, debris, dust or the like from entering into the interior of pickup truck cap and storage system 2. As will be described in greater detail later, a unique aspect of the present invention is the use of roof/sidewall/screen molding assembly 200 in order to retain the screen 28 between the raisable/liftable roof 24 and the pickup truck cap sidewalls 22. As can be seen in FIGS. 1 and 2, screen 28 is constructed in such a manner that screen 28 is triangular in shape. In this manner, screen 28 fits easily in the area between raisable/liftable roof 24 and the pickup truck cap sidewalls 22 once raisable/liftable roof 24 has been raised/lifted up. Another unique aspect of the present invention is the use of conventional spring inserts 32 that can be used to move screen 28 inwardly towards the interior of pickup truck cap and storage system 2 when roof 24 is being lowered. In this manner, as roof 24 is being lowered, spring inserts 32 conventionally act to cause the screen 28 to fold or pleat such that roof 24 does not lay on screen 28 when roof 24 has been lowered.

As previously discussed, located at one end of raisable/liftable roof 24 is roof hinge 30. Preferably, roof hinge 30 is conventionally attached to raisable/liftable roof 24 and to pickup truck cap sidewalls 22. It is to be understood that roof hinge 30 can be constructed on any suitable, durable, high strength, UV resistant material.

Figure 3:
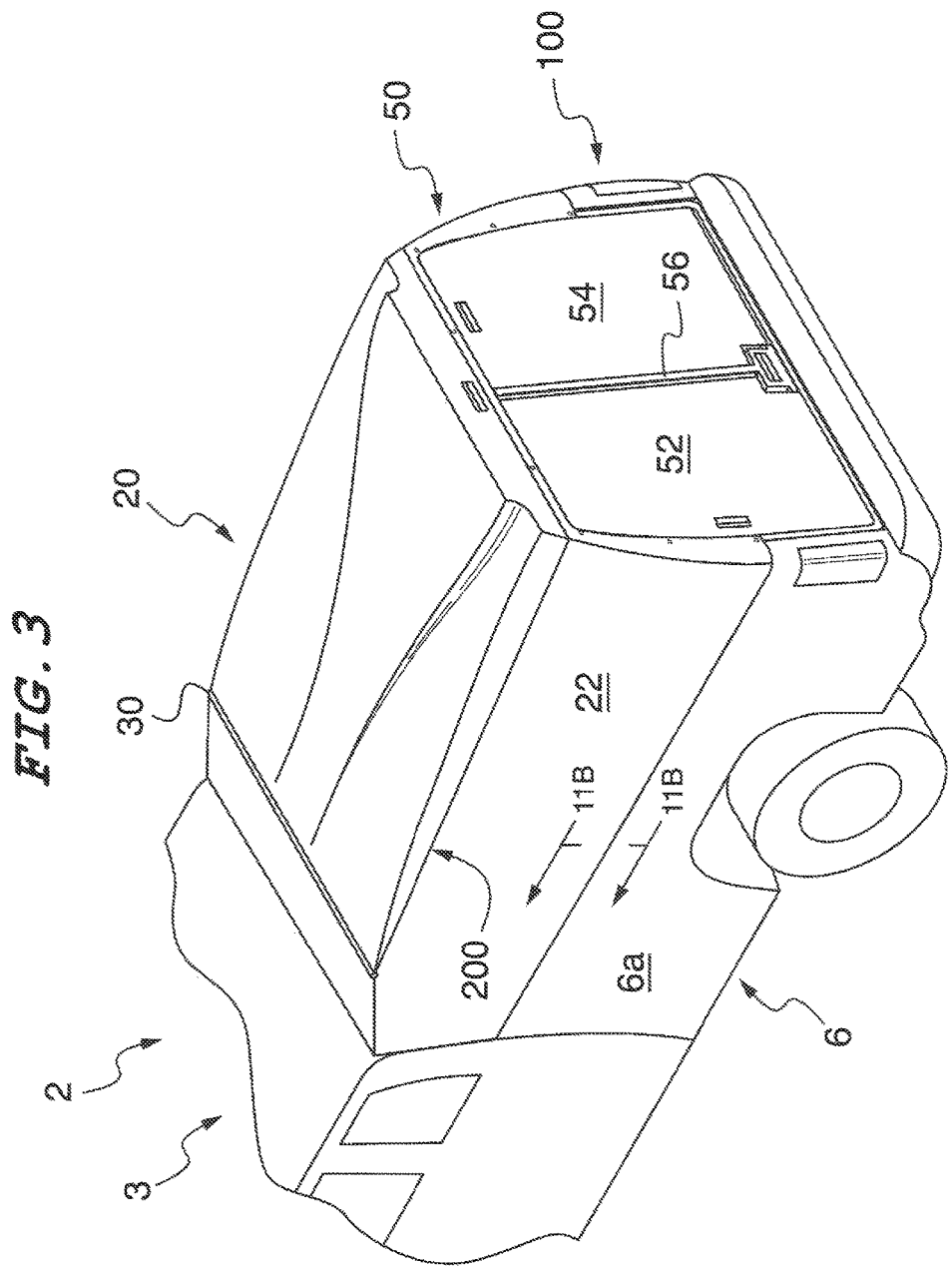
FIG. 3 is a schematic isometric view of the pickup truck cap and storage system being attached to a pickup truck bed with the pickup truck cap in the closed position and illustrating the location of the rear doors, constructed according to the present invention.

With respect to FIG. 3, there is illustrated pickup truck cap and storage system door assembly 50. Pickup truck cap and storage system door assembly 50 includes, in part, door 52, door 54 and door hinge 56. As will be described in greater detail later, door 52 and door 54 are conventionally, hingedly attached to pickup truck cap and storage system frame assembly 100. It is to be understood that doors 52 and 54 and hinge 56 can be constructed of any suitable, durable, high strength, UV resistant, rust resistant material. It is to be further understood that door 52 is conventionally attached to hinge 56 to allow door 52 to swing open, as will be discussed in greater detail later. An important factor of doors 52 and 54 and hinge 56 being that the doors 52 and 54 and hinge 56, when closed, provide safety and security to pickup truck cap and storage system 2.

Figure 4:
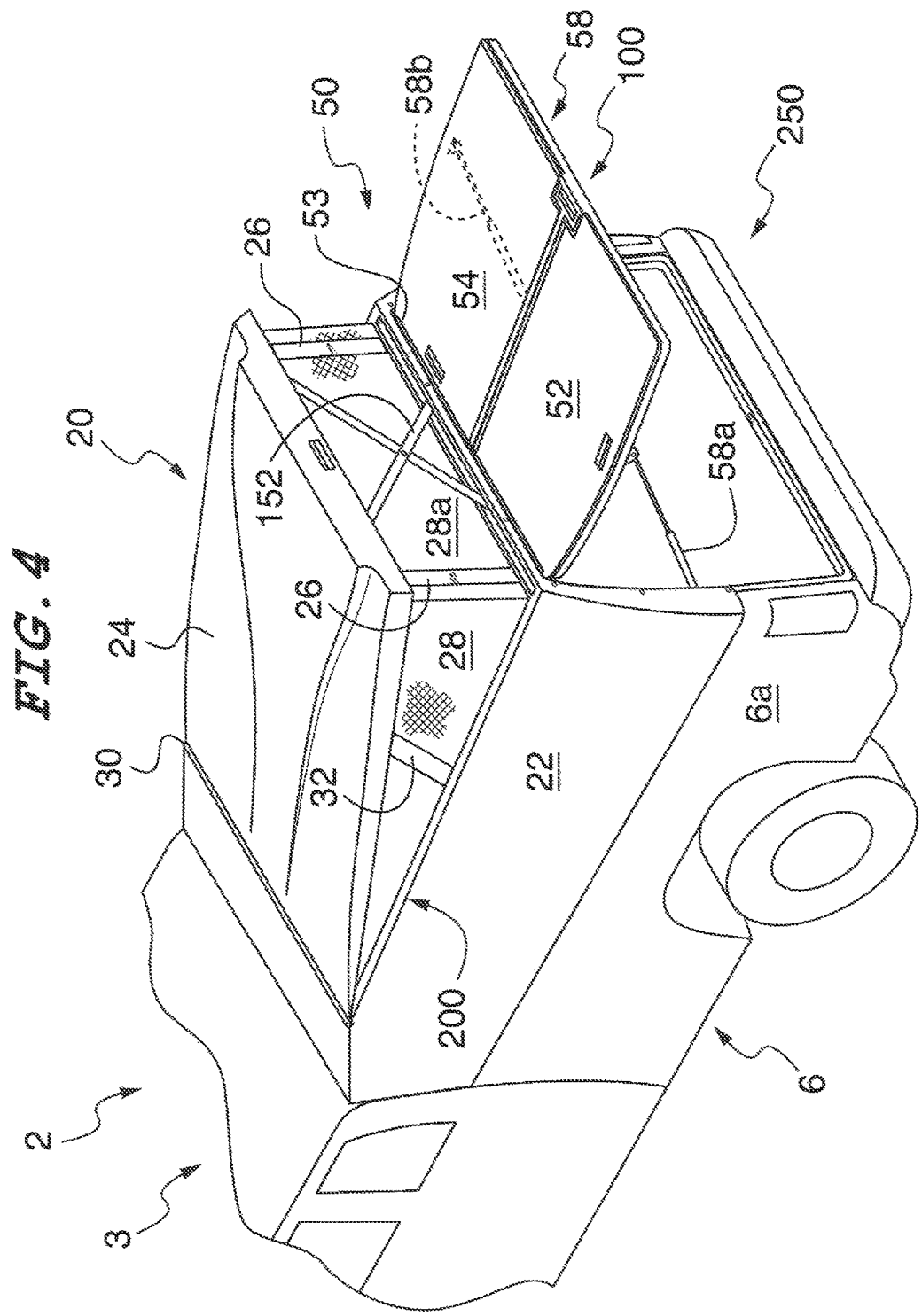
FIG. 4 is a schematic isometric view of the pickup truck cap and storage system being attached to a pickup truck bed with the pickup truck cap in the raised/open position and with the rear doors being raised/lifted up and illustrating the storage system, constructed according to the present invention.

As shown in FIG. 4, pickup truck cap and storage system door assembly 50 also includes, in part, door hinge 53 and at least two (2) piston assists 58 that are conventionally attached at one end to pickup truck cap and storage system frame assembly 100 and conventionally attached at the other end to pickup truck cap and storage system door assembly 50. In particular, one (1) piston assist 58a is attached at one end to door 52 and at the other end to pickup truck cap and storage system frame assembly 100. The other piston assist 58b is attached at one end to door 54 and at the other end to pickup truck cap and storage system frame assembly 100. Preferably, door hinge 53 can be constructed of any suitable, durable, high strength, UV resistant, rust resistant material. Preferably, piston assists 58 are any suitable hydraulic, pneumatic, electric or mechanical actuators that provide a lifting motion that assists the end user in raising/lifting the pickup truck cap and storage system door assembly 50. It is to be further understood that doors 52 and 54 are conventionally attached to one another and to door hinge 53 to allow pickup truck cap and storage system door assembly 50 to be raised/lifted up. It is to be even further understood that conventional waterproof seal 55 (FIG. 8) is located along the length where hinge 53 and roof 24 meet in order to substantially prevent any water from entering into the interior of pickup truck cap and storage system 2 through hinge 53.

Figure 5:
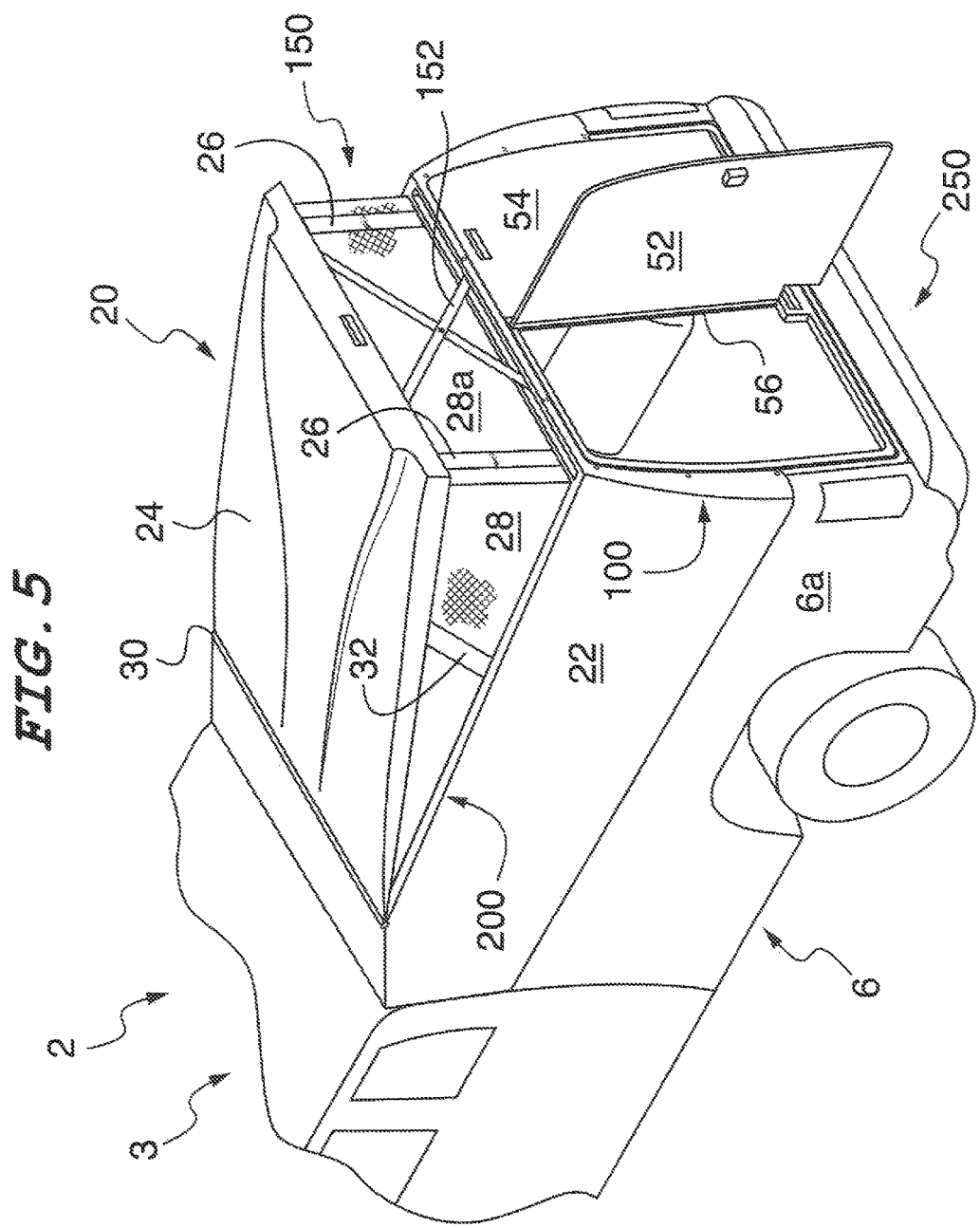
FIG. 5 is a schematic isometric view of the pickup truck cap and storage system being attached to a pickup truck bed with the pickup truck cap in the raised/open position and with one of the rear doors being opened to the side and illustrating the storage system, constructed according to the present invention.

With respect to FIG. 5, pickup truck cap and storage system 2 is illustrated with pickup truck cap 20 shown as being raised/lifted up and door 52 being opened. Also, shown in FIG. 5 is a portion of pickup truck cap and storage system assembly 250. A still further unique aspect of the present invention is that door 52 can be used to access the interior of pickup truck cap and storage system 2 once door 52 has been opened. It is to be further understood that the end user merely has to close door 52 and conventionally lock door 52 into place on pickup truck cap and storage system frame assembly 100 in order to secure door 52 to pickup truck cap and storage system frame assembly 100, as will be discussed in greater detail later.

As shown in FIG. 5, pickup truck cap 20 is illustrated as being raised/lifted up. As discussed earlier, piston assists 26 assist the end user in raising/lifting up of roof 24. Furthermore, pickup truck cap lift assembly 150 includes, in part, a conventional scissors mechanism 152 that will also assist the end user in raising/lifting up of roof 24. Preferably, scissors mechanism 152 can be constructed of any suitable, durable, high strength, UV resistant, rust resistant material. It is to be understood that scissors mechanism 152 is conventionally attached to pickup truck cap and storage system frame assembly 100 and roof 24. Another unique aspect of the present invention is that scissors mechanism 152 folds down and piston assists 26 retract or otherwise withdraw into themselves when roof 24 is lowered and scissors mechanism 152 folds up and out and piston assists 26 extend outwardly when roof 24 is raised/lifted up.

A further unique aspect of the present invention is that screen 28a is located behind scissors mechanism 152 and piston assists 26. Screen 28a, preferably, is constructed of the same material as screen 28. Furthermore, screen 28a is attached to roof 24 and pickup truck cap and storage system frame assembly 100 by Velcro® strips (not shown), as will be described in greater detail later. In this manner, the unique aspect of this embodiment is that screen 28a also substantially prevents insects, debris, dust or the like from entering into the interior of pickup truck cap and storage system 2.

Figure 6:
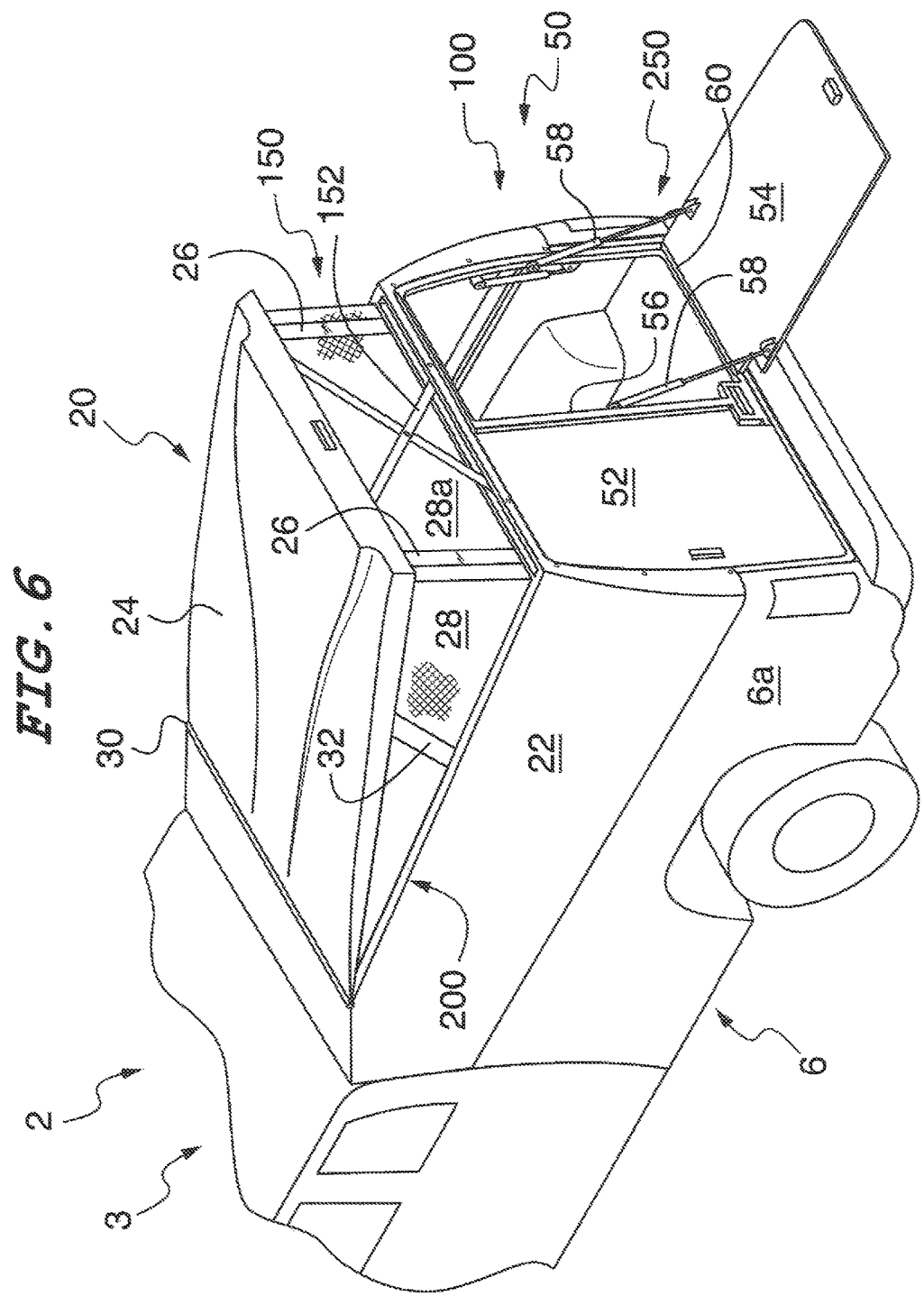
FIG. 6 is a schematic isometric view of the pickup truck cap and storage system being attached to a pickup truck bed with the pickup truck cap in the raised/open position and with one of the rear doors being lowered and illustrating the storage system, constructed according to the present invention.

With respect to FIG. 6, pickup truck cap 20 is also illustrated as being raised/lifted up. However, in this embodiment, door 54 is shown as being lowered. As shown in FIG. 6, pickup truck cap and storage system door assembly 50 further includes, in part, conventional door retainers 58 and conventional door hinge 60. It is to be understood that conventional door retainers 58 and conventional door hinge 60 can be constructed of any suitable, durable, high strength, UV resistant, rust resistant material. Furthermore, it is to be understood that one of the door retainers 58 is conventionally attached to door 54 and pickup truck cap and storage system frame assembly 100 and the other door retainer 58 is conventionally attached to door 54 and door hinge 56. A still further unique aspect of the present invention is that door 54 can be used as a table, worktable, bench or the like once door 54 has been lowered. It is to be further understood that the end user merely has to raise/lift up door 54 and conventionally lock door 54 into place on pickup truck cap and storage system frame assembly 100 in order to secure door 54 to pickup truck cap and storage system frame assembly 100, as will be discussed in greater detail later.

Regarding FIG. 7, there is illustrated a rear view of pickup truck cap and storage system 2 with doors 52 and 54 being closed. Also, pickup truck cap 20 is also illustrated as being lowered. In this particular embodiment, door hinges 56 and 60 can be more clearly seen.

With respect to FIG. 8, there is illustrated a rear view of pickup truck cap and storage system 2 with doors 52 and 54 being closed. Also, pickup truck cap 20 is also illustrated as being raised/lifted up. In this particular embodiment, piston assists 26, screen 28*a*, and scissors mechanism 152 can be more clearly seen.

Another unique aspect of the present invention is pickup truck cap and storage system frame assembly 100. Preferably, pickup truck cap and storage system frame assembly 100 is constructed of one-piece of durable, high strength, rust resistant material. As shown in FIG. 8, pickup truck cap and storage system frame assembly 100 is constructed so as to be conventionally attached to truck bed sidewalls 6*a*, pickup truck cap sidewalls 22 and roof 24. The bottom of pickup truck cap 20 is attached to truck bed sidewalls 6*a* by fasteners 402 (FIG. 11Ba), as will be discussed in greater later. In this manner, pickup truck cap and storage system frame assembly 100 and fasteners 402 provide structural strength to pickup truck cap and storage system 2 by substantially retaining pickup truck cap 20 onto truck bed sidewalls 6*a*. Also, pickup truck cap and storage system frame assembly 100 provides structural strength to pickup truck cap and storage system door assembly 50 in that door hinge 56 is conventionally attached to pickup truck cap and storage system frame assembly 100 at one end and to the truck bed 6 at the other end. Furthermore, as will be discussed in greater detail later, door hinge 53 is conventionally attached to pickup truck cap and storage system frame assembly 100 and pickup truck cap and storage system door assembly 50 in order to allow doors 52 and 54 to be properly raised and lowered, as discussed earlier.

Figure 9:
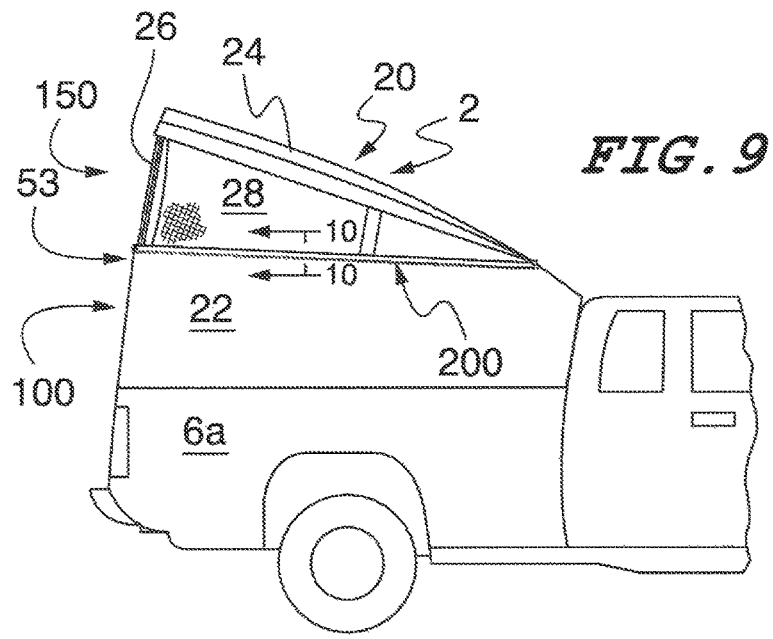
FIG. 9 is a schematic side view of the pickup truck cap and storage system frame being attached to a pickup truck bed with the pickup truck cap in the raised/open position and illustrating the location screen/roof molding, constructed according to the present invention.

Regarding FIG. 9, there is illustrated a side view of pickup truck cap and storage system 2 with doors 52 and 54 (not shown) being closed. In this embodiment, the pickup truck cap 20 is also illustrated as being raised/lifted up. Also, the door hinge 53 is more clearly shown in that door hinge 53 is conventionally attached to pickup truck cap and storage system frame assembly 100 and doors 52 and 54 by conventional techniques, as previously discussed.

Figure 10:
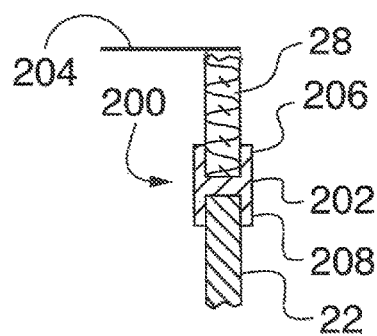
FIG. 10 is a close-up view, taken along lines 10-10 in FIG. 9, of the H-shaped roof/screen molding, constructed according to the present invention.

With respect to FIG. 10, there is illustrated roof/sidewall/screen molding assembly 200. Roof/sidewall/screen molding assembly 200 includes, in part, H-shaped molding 202, adhesive strips 204, upper molding attachment 206 and lower molding attachment 208. Preferably, H-shaped molding 202 can be constructed of any suitable, durable, high strength, UV resistant, rust resistant material. It is to be understood that H-shaped molding 202 runs along the length between roof 24 and the top of pickup truck cap sidewalls 22 along both sides of truck bed sidewalls 6*a*.

In order to properly attach screen 28 to the roof 24 and the top of pickup truck cap sidewalls 22, the application of roof/sidewall/screen molding assembly 200 will now be discussed. In particular, in order to attach screen 28 to roof 24, one end of screen 28 is conventionally attached along the length of H-shaped molding 202 at upper molding attachment 206. Preferably, screen 28 is attached to upper molding attachment 206 by conventional techniques such as adhesives or mechanical fasteners. Preferably, screen 28 is attached to conventional fasteners 204, such as Velcro@, whereby fasteners 204 are conventionally attached to the bottom of roof 24. The tops of pickup truck cap sidewalls 22 are conventionally attached along the length of H-shaped molding 202 at lower molding attachment 208. Preferably, the tops of pickup truck cap sidewalls 22 are attached to lower molding attachment 208 by conventional techniques such as adhesives or mechanical fasteners. In this manner, a durable closure is achieved between roof 24 and screen 28 and pickup truck cap sidewalls 22 and screen 28 in order to substantially prevent insects, debris, dust or the like from entering into the interior of pickup truck cap and storage system 2.

In order to attach screen 28*a* to roof 24 and the top of pickup truck cap sidewalls 22 located adjacent to door hinge 53, it is to be understood that the top of screen 28*a* is attached to conventional fasteners 204, such as Velcro®, whereby fasteners 204*a* (FIG. 8) are conventionally attached to the bottom of roof 24. The bottom of screen 28*a* is attached to conventional fasteners 204*b*, such as Velcro@, whereby fasteners 204*b* (FIG. 8) are conventionally attached to the top of pickup truck cap sidewalls 22 located adjacent to door hinge 53. It is to be even further understood that the screen 28*a* is conventionally attached to screen 28 by conventional fasteners 204*c*, such as Velcro®. In this manner, fasteners 204*a*, 204*b* and 204*c* are used to secure screen 28 to screen 28*a* in order to provide a durable, air permeable closure between screen 28 and screen 28*a* which should substantially prevent insects, debris, dust or the like from entering into the interior of pickup truck cap and storage system 2.

With reference now to FIG. 11A, there is illustrated pickup truck cap and storage system lock assembly 300. Pickup truck cap and storage system lock assembly 300 includes, in part, conventional pickup truck cap and storage system door assembly lock 302, conventional door lock 304, conventional door lock 306 and conventional roof lock 308. In particular, pickup truck cap and storage system door assembly lock 302 is used to lock pickup truck cap and storage system door assembly 50 to truck bed 6. Door lock 304 is used to lock door 52 to pickup truck cap and storage system frame assembly 100. Door lock 306 is used to lock door 54 to pickup truck cap and storage system frame assembly 100. Roof lock 308 is used to lock roof 24 to pickup truck cap and storage system frame assembly 100. It is to be understood that while conventional locking devices can be used as locks 302, 304, 306 and 308, a unique aspect of the present invention is that the pickup truck cap and storage system lock assembly 300 can be used to properly lock pickup truck cap and storage system door assembly 50, door 52, door 54 and roof 24 so as to provide a safe and secure pickup truck cap and storage system 2.

Regarding FIG. 11B, as discussed earlier, pickup truck cap sidewalls 22 of pickup truck cap 20 are conventionally attached to the top of truck bed sidewalls 6*a* by conventional fasteners 402 around the perimeter where pickup truck cap 20 contacts the top of truck bed sidewalls 6*a*. Preferably, fasteners 402 are constructed of any suitable durable, high strength, UV resistant, rust resistant material. The important factor regarding the use of fasteners 402 is that once the pickup truck cap 20 has been attached to the top of truck bed sidewalls 6*a* by conventional fasteners 402, fasteners 402 should not allow pickup truck cap 20 to move around on the top of truck bed sidewalls 6*a* or allow pickup truck cap 20 to become dislodged from the top of truck bed sidewalls 6*a*.

Figure 12:
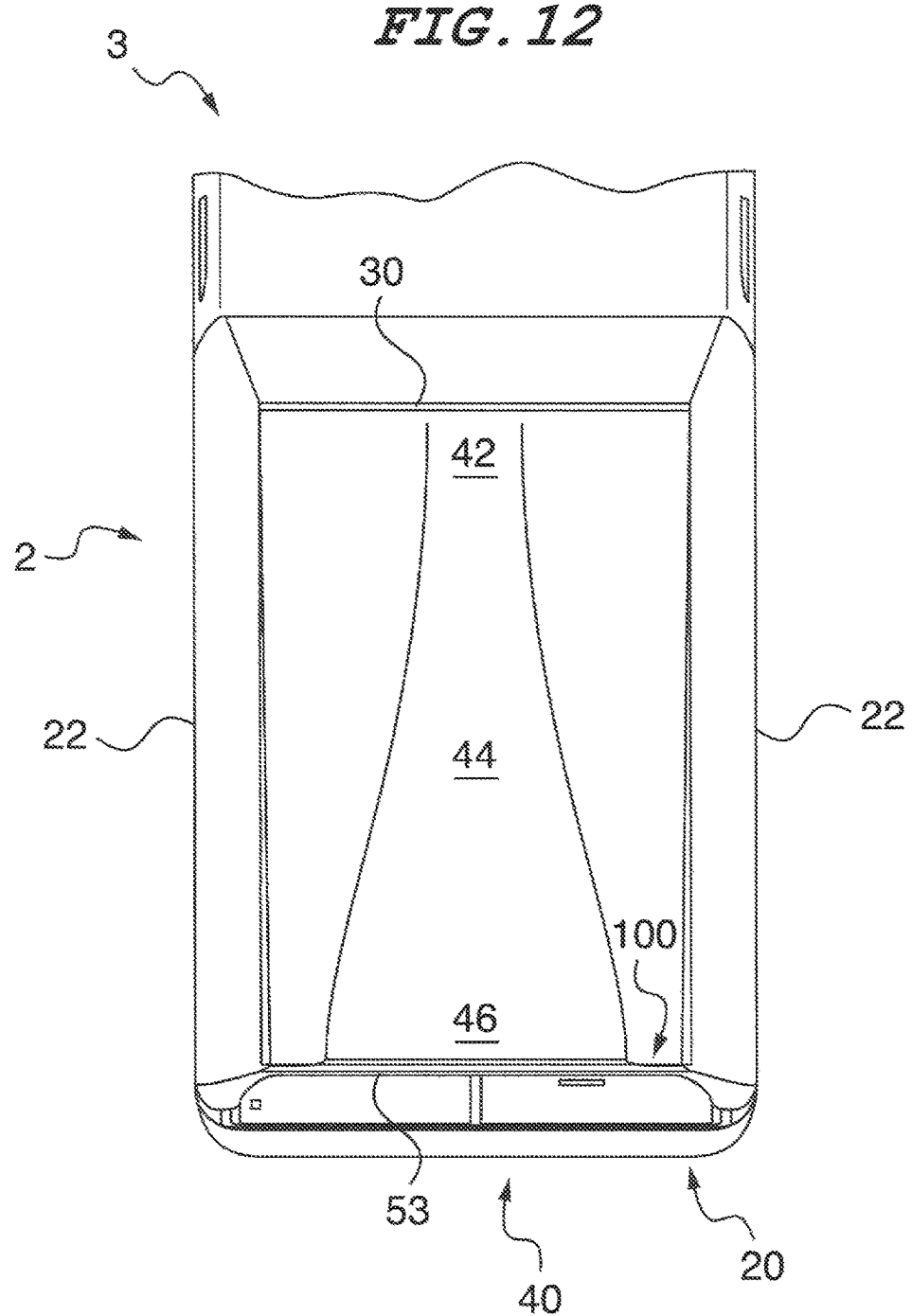
FIG. 12 is a schematic top view of the pickup truck cap and storage system being attached to a pickup truck bed and illustrating the location of the front hinge, constructed according to the present invention.

With respect to FIG. 12, the top of pickup truck cap 20 is illustrated. In particular, the top of pickup truck cap 20 includes an aerodynamic raised area 40 that rises from lower raised area end 42 through mid-raised area 44 to upper raised area 46. If one compares FIGS. 1 and 12, it can be more readily ascertained how aerodynamic raised area 40 rises from lower raised area end 42 through mid-raised area 44 to upper raised area 46. Furthermore, as shown in FIG. 12, raised area 40 flares outwardly from lower raised area end 42 through mid-raised area 44 to upper raised area 46. It is to be understood that aerodynamic raised area 40 can be formed into/onto the top or pickup truck cap 20 by conventional techniques. Another unique aspect of the present invention is that aerodynamic raised area 40 can be used to improve the air flow across the top of pickup truck cap 20 as the air flows from lower raised area end 42, across mid-raised area 44 and across upper raised area 46 by reducing vehicle drag and preventing undesired lift forces and other causes of aerodynamic instability at high speeds. An even further unique aspect of the present invention is that aerodynamic raised area 40, in conjunction with pickup truck cap and storage system 2, can be used to improve the aerodynamics (including reduced drag and lift and increased stability) of a vehicle or other such similar object that is being towed behind pickup truck 3.

Figure 13:
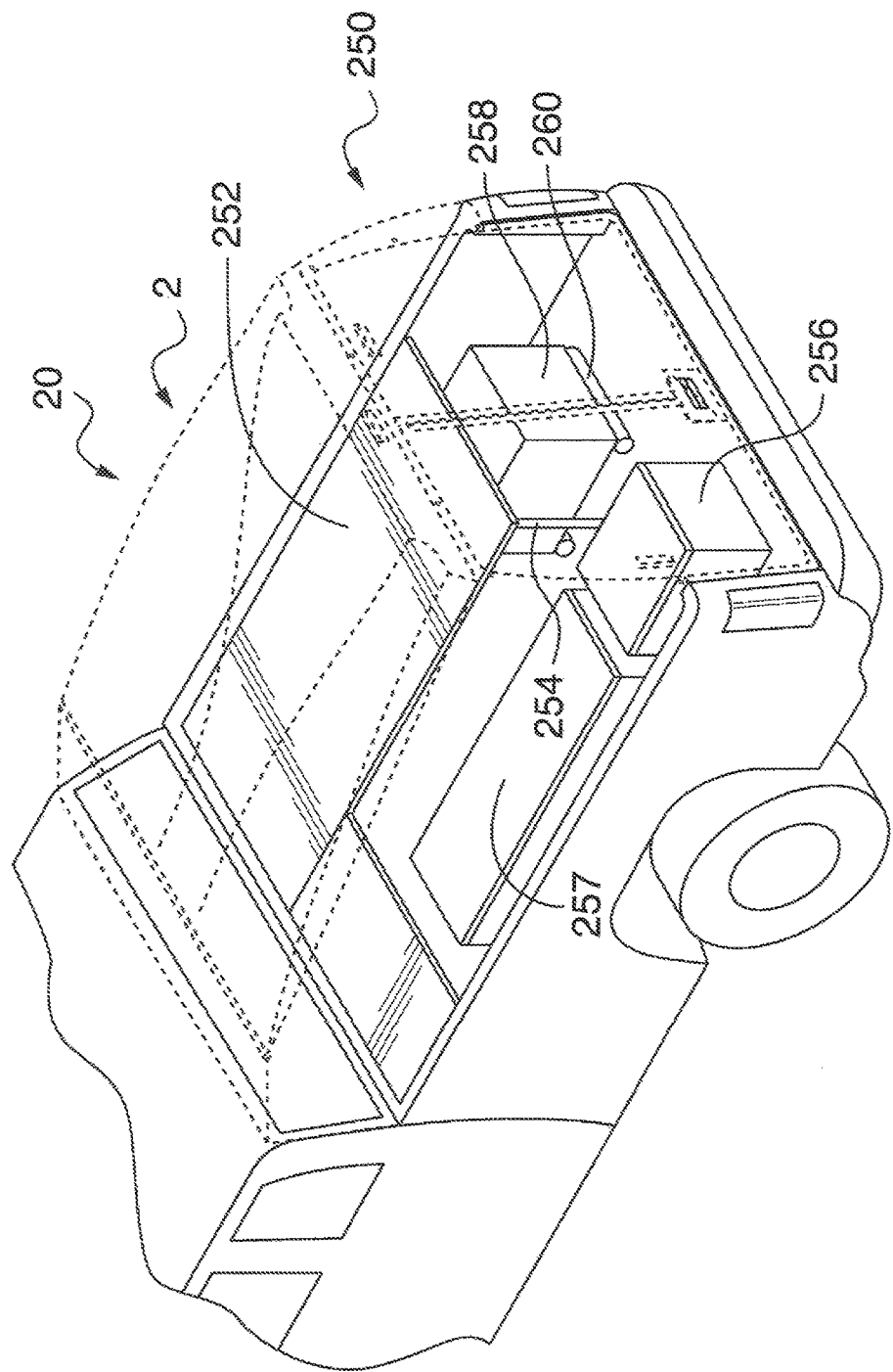
FIG. 13 is an isometric view of the pickup truck cap and storage system being attached to a pickup truck bed with the pickup truck cap in the closed position and illustrating the storage system, constructed according to the present invention.
Figure 14:
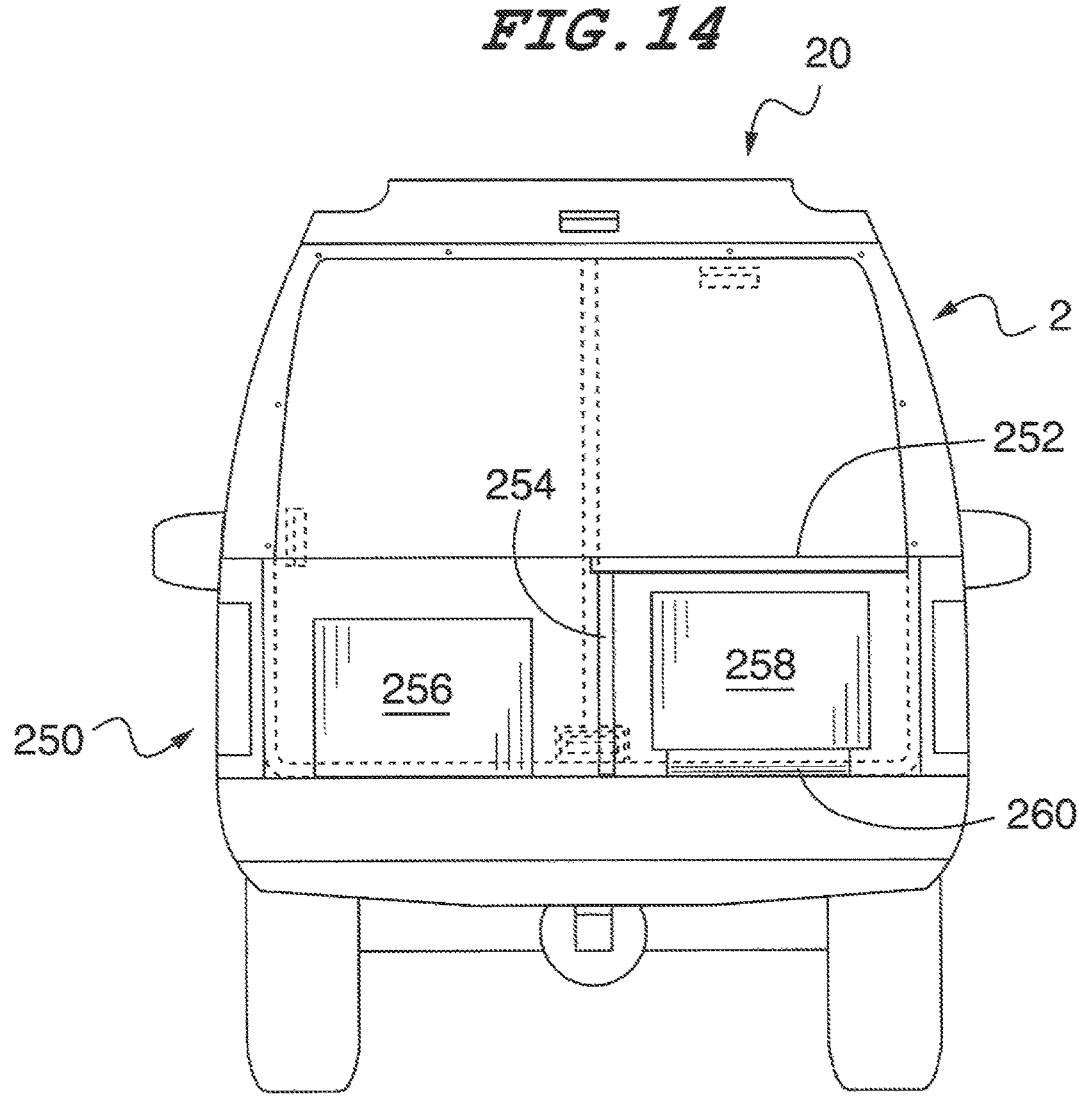
FIG. 14 is a rear view of the pickup truck cap and storage system being attached to a pickup truck bed and illustrating the storage system, constructed according to the present invention.

Regarding FIGS. 13 and 14, there is illustrated pickup truck cap and storage system assembly 250. Pickup truck cap and storage system assembly 250 includes, in part, shelf 252, shelf support 254, storage containers 256, 257 and 258, and roller system 260. Preferably, shelf 252 and shelf support 254 are constructed of any suitable durable, lightweight, high strength materials. It is to be understood that storage containers 256, 257, and 258 can be any conventional container that is capable of being located under shelf 252. Also, roller system 260 can be any suitable roller system that can be located under container 258 (or container 256, if desired) in order that container 258 (or container 256) can be easily pushed under or pulled out from under shelf 252. Furthermore, shelf support 254 should be constructed so as to provide the proper support for shelf 252. In this manner, shelf support 254 is conventionally attached to the bottom of shelf 252 and truck bed 6.

Another unique aspect of the present invention is that pickup truck cap and storage system assembly 250 allows the end user to store a variety of items in containers 256, 257 and 258. Furthermore, pickup truck cap and storage system assembly 250 allows the end user to store the containers 256, 257 and 258 under shelf 252 so that the containers 256, 257 and 258 can be easily accessed by the end user. In this manner, pickup truck cap and storage system assembly 250 provides a means whereby the end user can use the pickup truck cap and storage system 2 to store tools, work materials, or the like if the end user desires to use the pickup truck cap and storage system 2 as a work vehicle. As discussed earlier, the end user can open door 54 to create a work bench or work table which can be highly desirable and eliminates the need for the end user to bring a work table to the job site.

An even further unique aspect of the present invention is that pickup truck cap and storage system assembly 250 allows the end user to utilize pickup truck cap and storage system 2 as a recreational motor vehicle equipped with a living space and amenities found at home. In particular, pickup truck cap and storage system assembly 250 allows the end user to store the containers 256, 257 and 258 under shelf 252 so that the containers 256, 257 and 258 can be easily accessed by the end user. In this manner, pickup truck cap and storage system assembly 250 provides a means whereby the end user can use the pickup truck cap and storage system 2 to store food, small electrical appliances, small portable electrical generators, cooking implements, camping equipment, firearms, ammunition, clothing, footwear or the like if the end user desires to use the pickup truck cap and storage system 2 as a type of recreational vehicle. As discussed earlier, the end user can open door 54 to create a cooking/dining table which can be highly desirable and eliminates the need for the end user to bring a cooking/dining table to the camp site.

With reference now to FIGS. 1-14, the operation and use of the pickup truck cap and storage system 2 will now be discussed. Assume that the end user is planning on using the pickup truck cap and storage system 2 as a recreational vehicle to take camping. In this case, the end user unlocks lock 304 so that door 52 can be opened (FIG. 5). The end user may also unlock lock 306 so that door 54 can be lowered (FIG. 6). Optionally, the end user may just unlock lock 302 so that pickup truck cap and storage system door assembly 50 can be raised (FIG. 4).

Once the doors 52 and 54 have been opened, the end user can then remove containers 256, 257 and 258 from pickup truck cap and storage system assembly 250 (FIGS. 13 and 14) so that the end user can place the desired items in the containers 256, 257 and 258 that will be needed for the camping trip. After the containers 256, 257 and 258 have been properly filled with the camping supplies, the end user then places the containers 256, 257, and 258 under shelf 252, as discussed earlier (FIGS. 13 and 14).

Upon the completion of the loading of truck cap and storage system 2 with the desired camping supplies, the end user can then lock the doors 52 and 54 and roof 24 by using locks 302, 304, 306 and 308, as discussed earlier (FIG. 11A). The end user can then drive the truck cap and storage system 2 to the desired camping site.

After reaching the desired camping site, the end user can then unlock the doors 52 and 54 and roof 24 by unlocking locks 302, 304, 306 and 308, as discussed earlier (FIG. 11A). Once the doors 52 and 54 have been unlocked, the end user can lower door 54 so that door 54 can be used as a cooking/dining table and gain access to container 258. Also, door 52 can be opened to gain access to containers 256 and 257.

Another unique aspect of the present invention is that the end user can raise/lift up roof 24 (FIG. 6). In this manner, the end user can push on the bottom of roof 24 to raise/lift roof 24. It is to be understood that piston assists 26 and scissor mechanism 152 (FIG. 8) are used to assist the end user in raising/lifting up of roof 24. As the roof 24 is raised up, the spring inserts 32 (FIG. 6) conventionally act to cause the screen 28 to unfold and stretch out. In this manner, fresh air will be allowed to enter into the interior of truck cap and storage system 2 while at the same time substantially preventing insects, debris, dust or the like from entering into the interior of pickup truck cap and storage system 2. It is to be understood that as roof 24 is raised/lifted up, screen 28a will also unfold and stretch out. Also, the raising of roof 24 provides the end user with increased headroom in the interior of pickup truck cap and storage system 2 which is highly desirable.

Furthermore, it is to be understood that pickup truck cap and storage system assembly 250 can be modified to include a mattress, sleeping bag(s) (not shown) or other similar sleeping implement. In this manner, the mattress or sleeping bags can be placed on top of shelf 252 (FIG. 13) so that the combination of the shelf 252 and the mattress/sleeping bags can be used as a bed.

Once the camping trip has concluded, the end user simply stores the camping equipment back into the containers 256, 257 and 258 and places the containers 256, 257 and 258 back under shelf 252 (FIGS. 13 and 14). The end user can then conventionally pull down on roof 24 (using a conventional rope/strap (not shown) attached to the bottom of roof 24) so that roof 24 is lowered towards pickup truck cap sidewalls 22 (FIG. 5). As discussed earlier, as roof 24 is being lowered, spring inserts 32 conventionally act to cause the screen 28 to fold or pleat such that roof 24 does not lay on screen 28 when roof 24 has been lowered.

After the roof 24 has been lowered and all of the camping equipment has been properly secured, the end user can then conventionally operate locks 302, 304, 306 and 308 in order to lock doors 52 and 54 and roof 24. Once the doors 52 and 54 and roof 24 have been properly locked, the end user can then proceed back home.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein are a new and improved pickup truck cap and storage system. The preferred pickup truck cap and storage system, according to various embodiments of the present invention, offers the following advantages: ease of use; lightness in weight; durability; excellent pickup cap characteristics; ease of raising of the roof; ease of lowering of the roof; increased headroom in the cap area; improved aerodynamics; excellent storage characteristics; and ease of locking the pickup truck cap and storage system. In fact, in many of the preferred embodiments, these advantages of ease of use, lightness in weight, durability, excellent pickup cap characteristics, ease of raising of the roof, ease of lowering of the roof, increased headroom in the cap area, improved aerodynamics, excellent storage characteristics, and ease of locking the pickup truck cap and storage system are optimized to an extent that is considerably higher than heretofore achieved in prior, known pickup truck caps.

I claim:

1. A pickup truck cap and storage system, comprising:
a pickup truck having a truck bed and a plurality of truck bed sidewalls operatively connected to the truck bed;
a pickup truck cap and storage system frame assembly operatively connected to one end of the truck bed and a portion of each of the plurality of truck bed sidewalls;
a pickup truck cap assembly operatively connected to the plurality of truck bed sidewalls and the pickup truck cap and storage system frame assembly,
wherein the pickup truck cap assembly further comprises a plurality of truck cap sidewalls, a roof having a first end and a second end, wherein the roof is located adjacent to the plurality of truck cap sidewalls, a hinge operatively connected to the first end of the roof and one of the plurality of truck cap sidewalls, and a pickup truck cap lift assembly operatively connected to the second end of the roof and the pickup truck cap and storage system frame assembly for raising and lowering the roof,
wherein the pickup truck cap lift assembly comprises a first plurality of piston assists operatively connected to the second end of the roof and the pickup truck cap and storage system frame assembly, and
a scissors mechanism located adjacent to the first plurality of piston assists and operatively connected to the second end of the roof and the pickup truck cap and storage system frame assembly;
a pickup truck cap and storage system door assembly operatively connected to the pickup truck cap and storage system frame assembly and located adjacent to one end of the pickup truck cap assembly, wherein the truck bed, the plurality of truck bed sidewalls, the pickup truck cap assembly, and the pickup truck cap and storage system door assembly, when operatively connected, form an interior space in the pickup truck cap and storage system; and
a pickup truck cap and storage system assembly located within the interior of the pickup truck cap and storage system.

2. The pickup truck cap and storage system, according to claim 1, wherein the pickup truck cap assembly is further comprised of:
a roof/sidewall/screen molding assembly operatively connected to a top of the plurality of truck bed sidewalls and along a bottom of the plurality of truck cap sidewalls.

3. The pickup truck cap and storage system, according to claim 2, wherein the pickup truck cap assembly is further comprised of:
a first screen operatively connected to the roof/sidewall/screen molding assembly and a bottom of the roof; and
a second screen operatively connected to the first screen, the bottom of the roof and a portion of the plurality of truck cap sidewalls.

4. The pickup truck cap and storage system, according to claim 1, wherein the pickup truck cap and storage system door assembly is further comprised of:
a first door hinge operatively connected to the truck bed and the pickup truck cap and storage system frame assembly;
a first door operatively connected to the first door hinge;
a second door hinge operatively connected to the truck bed;
a second door operatively connected to the second door hinge; and
a third door hinge located adjacent to the second end of the roof and operatively connected to the pickup truck cap and storage system frame assembly, wherein the first and second doors, when secured together, can be operatively connected to the third door hinge.

5. The pickup truck cap and storage system, according to claim 1, wherein the pickup truck cap and storage system assembly is further comprised of:

a shelf support operatively connected to the truck bed and the pickup truck cap and storage system frame assembly;

a shelf located on top of the shelf support;

a plurality of containers located under the shelf; and a roller operatively connected to at least one of the plurality of containers for assisting in the insertion into and the removal from the interior of the pickup truck cap and storage system.

6. The pickup truck cap and storage system, according to claim 1, wherein the pickup truck cap assembly is further comprised of:

an aerodynamic raised area located along a portion of the top of the roof.

7. The pickup truck cap and storage system, according to claim 3, wherein the roof/sidewall/screen molding assembly is further comprised of:

an H-shaped molding having an upper molding attachment and a lower molding attachment, wherein the first screen is operatively connected to the upper molding attachment and the lower molding attachment is operatively connected to a portion of the plurality of truck cap sidewalls.

8. A recreational vehicle, comprising:

a pickup truck having a truck bed and a plurality of truck bed sidewalls operatively connected to the truck bed;

a pickup truck cap and storage system frame assembly operatively connected to one end of the truck bed and a portion of each of the plurality of truck bed sidewalls;

a pickup truck cap assembly operatively connected to the plurality of truck bed sidewalls and the pickup truck cap and storage system frame assembly;

a pickup truck cap and storage system door assembly operatively connected to the pickup truck cap and storage system frame assembly and located adjacent to one end of the pickup truck cap assembly, wherein the truck bed, the plurality of truck bed sidewalls, the pickup truck cap assembly, and the pickup truck cap and storage system door assembly, when operatively connected, form an interior space in the pickup truck cap and storage system; and a pickup truck cap and storage system assembly located within the interior of the pickup truck cap and storage system, wherein the pickup truck cap and storage system door assembly further comprises a first door hinge operatively connected to the truck bed and the pickup truck cap and storage system frame assembly, a first door operatively connected to the first door hinge, a second door hinge operatively connected to the truck bed, a second door operatively connected to the second door hinge, and a third door hinge operatively connected to one end of the pickup truck cap and storage system frame assembly, wherein the first and second doors, when secured together, can be operatively connected to the third door hinge.

9. The recreational vehicle, according to claim 8, wherein the pickup truck cap assembly is further comprised of:

a plurality of truck cap sidewalls;

a roof having a first end and a second end, wherein the roof is located adjacent to the plurality of truck cap sidewalls;

a hinge operatively connected to the first end of the roof and one of the plurality of truck cap sidewalls; and a pickup truck cap lift assembly operatively connected to the second end of the roof and the pickup truck cap and storage system frame assembly for raising and lowering the roof.

10. The recreational vehicle, according to claim 9, wherein the pickup truck cap lift assembly is further comprised of:

a first plurality of piston assists operatively connected to the second end of the roof and the pickup truck cap and storage system frame assembly; and a scissors mechanism located adjacent to the first plurality of piston assists and operatively connected to the second end of the roof and the pickup truck cap and storage system frame assembly.

11. The recreational vehicle, according to claim 9, wherein the pickup truck cap assembly is further comprised of:

a roof/sidewall/screen molding assembly operatively connected to a top of the plurality of truck bed sidewalls and along a bottom of the plurality of truck cap sidewalls.

12. The recreational vehicle, according to claim 11, wherein the pickup truck cap assembly is further comprised of:

a first screen operatively connected to the roof/sidewall/screen molding assembly and a bottom of the roof; and a second screen operatively connected to the first screen, the bottom of the roof and a portion of the plurality of truck cap sidewalls.

13. The recreational vehicle, according to claim 8, wherein the pickup truck cap and storage system assembly is further comprised of:

a shelf support operatively connected to the truck bed and the pickup truck cap and storage system frame assembly;

a shelf located on top of the shelf support;

a plurality of containers located under the shelf; and a roller operatively connected to at least one of the plurality of containers for assisting in the insertion into and the removal from the interior of the pickup truck cap and storage system.

14. The recreational vehicle, according to claim 9, wherein the pickup truck cap assembly is further comprised of:

an aerodynamic raised area located along a portion of the top of the roof.

15. The recreational vehicle, according to claim 12, wherein the roof/sidewall/screen molding assembly is further comprised of:

an H-shaped molding having an upper molding attachment and a lower molding attachment, wherein the first screen is operatively connected to the upper molding attachment and the lower molding attachment is operatively connected to a portion of the plurality of truck cap sidewalls.

16. A method of modifying a pickup truck with a pickup truck cap and storage system, comprising the steps of:

providing a pickup truck having a truck bed and a plurality of truck bed sidewalls operatively connected to the truck bed;

providing a pickup truck cap and storage system frame assembly operatively connected to one end of the truck bed and a portion of each of the plurality of truck bed sidewalls;

providing a pickup truck cap assembly operatively connected to the plurality of truck bed sidewalls and the pickup truck cap and storage system frame assembly;

providing a pickup truck cap and storage system door assembly operatively connected to the pickup truck cap and storage system frame assembly and located adjacent to one end of the pickup truck cap assembly, wherein the truck bed, the plurality of truck bed sidewalls, the pickup truck cap assembly, and the pickup truck cap and storage system door assembly, when operatively connected, form an interior space in the pickup truck cap and storage system,
  wherein the step of providing a pickup truck cap and storage system door assembly is further comprised of the steps of;
  providing a first door hinge operatively connected to the truck bed and the pickup truck cap and storage system frame assembly,
  providing a first door operatively connected to the first door hinge,
  providing a second door hinge operatively connected to the truck bed,
  providing a second door operatively connected to the second door hinge, and
  providing a third door hinge operatively connected to one end of the pickup truck cap and storage system frame assembly, wherein the first and second doors, when secured together, can be operatively connected to the third door hinge; and
  providing a pickup truck cap and storage system assembly located within the interior of the pickup truck cap and storage system.

17. The method of modifying a pickup truck with a pickup truck cap and storage system, according to claim 16, wherein the step of providing the pickup truck cap assembly is further comprised of the steps of:
  providing a plurality of truck cap sidewalls;
  providing a roof having a first end and a second end, wherein the roof is located adjacent to the plurality of truck cap sidewalls;
  providing a hinge operatively connected to the first end of the roof and one of the plurality of truck cap sidewalls; and
  providing a pickup truck cap lift assembly operatively connected to the second end of the roof and the pickup truck cap and storage system frame assembly for raising and lowering the roof.

* * * * *